Figure 1:
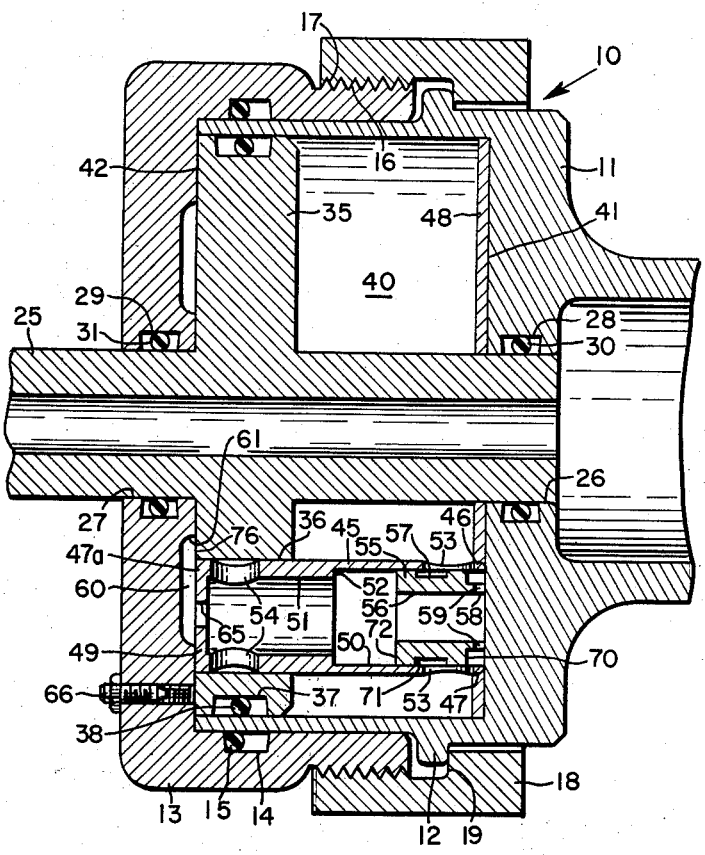

Nov. 4, 1958     H. R. SMITH     2,858,910

FLUID DAMPING DEVICE

Filed June 24, 1955

*INVENTOR.*
HAROLD R. SMITH
BY
*ATTORNEYS*

United States Patent Office 2,858,910
Patented Nov. 4, 1958

2,858,910

FLUID DAMPING DEVICE

Harold R. Smith, San Pedro, Calif., assignor, by mesne assignments, to the United States of America as represented by the Secretary of the Navy Application June 24, 1955, Serial No. 517,946

6 Claims. (Cl. 188—96)

The present invention relates to a fluid damping device and more particularly to a new and novel damping device employing a movable shuttle member which provides a varying metering effect according to the direction of relative movement between two members.

The present invention is adapted for use in any installation where it is desired to control the damping of movement between two relatively movable members in both directions of relative movement wherein the amount of desired damping is considerably greater in one direction than in the other. The invention device is adapted for use in any application wherein this mode of operation is desirable, but is particularly adapted for use in the drag brace shock struts of aircraft landing gear installations which require this type of metering for successful operation.

The invention device is especially adapted for use with an air-oil shock absorber incorporated in an aircraft landing gear drag brace wherein different rates of damping are desired. When landing the aircraft, the shock absorber is subjected to "spin-up" loads causing a compression stroke of the shock absorber. Such compression strokes are opposed by the air pressure in the shock absorber, and upon the return or expansion stroke, the air pressure which has built up within the absorber adds to the "spring-back" loads, consequently the "spring-back" loads may be as much as thirty percent greater than the "spin-up" loads thereby necessitating the utilization of a fluid damping device which permits a relatively rapid compression stroke and a considerably slower expansion stroke.

Prior art devices have been constructed to provide such a differential metering effect, but these devices are excessively complex in construction, and the piston members thereof have a tendency to bottom against the ends of the cylinder member. It is evident that since large loads are ordinarily applied to devices of this nature, the striking of the piston against the cylinder wall is very undesirable and may cause serious structural damage to the device.

In the present invention, a movable shuttle member effectively controls the metering or fluid flow within the device according to the direction of relative movement between the piston and cylinder thereof. A flange formed on the piston member of the device progressively encloses and seals apertures in a sleeve member to provide a cushioning effect in both directions of relative movement and thereby substantially eliminate bottoming of the piston against the ends of the cylinder.

An object of the present invention is the provision of a new and novel fluid damping device which varies the metering effect according to the direction of relative movement between two members.

Another object is to provide a fluid damping device wherein a cushioning effect is provided between the cylinder and piston members near the end of the compression and expansion strokes thereof.

A further object of the invention is the provision of a fluid damping device which is simple and inexpensive in construction, yet sturdy and reliable in operation.

Figure 2:
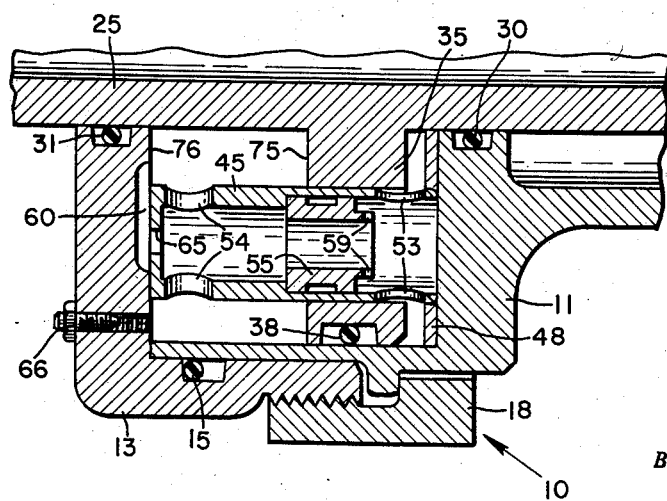

Other objects and many of the attendant advantages of this invention will be readily appreciated as the same becomes better understood by reference to the following detailed description when considered in connection with the accompanying drawings wherein:

Fig. 1 is a longitudinal section illustrating a shock strut embodying the invention device and showing the position of the components of the present invention when the cylinder member and the piston member are in initial extended position, and Fig. 2 is a view similar to Fig. 1 partially broken away showing the position of the components of the invention device near the end of a compression stroke wherein the shock strut members have almost reached the limit of their travel toward one another.

Referring now to the drawings wherein like reference characters designate similar parts in both views, there is shown in Fig. 1 a cylinder member indicated generally by reference numeral 10 and including a hollow cylindrical body member 11 having a circumferential flange 12 formed on the outer surface thereof. A cup-shaped member 13, slidably fitted over the outer open end of member 11, is provided with a circumferential channel 14 in the inner surface thereof containing an O-ring seal 15 for tightly sealing member 13 with respect to member 11. Screw threads 16 formed on the outer surface of member 13 are in engagement with screw threads 17 formed on the inner surface of a nut 18, the nut having a circumferential shoulder 19 formed thereon which engages flange 12 whereby when the nut is tightened into assembled position as shown member 13 is secured to member 11.

A cylindrical piston member 25 is slidably mounted within cylindrical bearing surfaces 26 and 27, formed longitudinally through the centers of members 11 and 13 respectively, the latter members being provided with channels 28 and 29 recessed in the aforementioned bearing surfaces and O-ring seals 30 and 31 respectively for tightly sealing the cylinder with respect to the piston. It is evident that the piston and the cylinder may be connected in any suitable manner to reciprocating portions of the aircraft the movements of which it is desired to damp, the piston and cylinder members being normally urged into extended position away from one another as shown in Fig. 1 by a suitable means such as a coil spring or the like (not shown).

The piston is provided with a circumferential flange 35 having a cylindrical opening 36 extending therethrough and the flange is provided with a circumferential channel 37 in the outer surface thereof containing an O-ring seal 38 for tightly sealing the outer surface of the flange with respect to the inner surface of member 11. It is apparent that an annular cavity 40 is provided between the piston and the cylinder, the cavity being laterally bounded by the cylindrically inner surface of member 11 and the cylindrically outer surface of piston 25 in and lying longitudinally between surface 41 of member 11 and surface 42 of member 13. It is apparent that flange 35 occupies a portion of this cavity at all times, yet is freely movable therein in accordance with relative movements of the cylinder and the piston.

A tubular sleeve 45 is disposed within cavity 40 and is fixed relative to the cylinder 10. A first end 46 of the sleeve is mounted within a cylindrical opening 47 of a spacer member 48 which is suitably secured to wall 41. The opposite end 47a of the sleeve extends through the opening in the piston flange as seen in Fig. 1, there being a frictional fit between the outer surface of the sleeve and the inner surface of the opening such that an effective seal is provided between the flange and the outer surface of the sleeve. End 46 of the sleeve is open since wall 41 effectively closes this end of the sleeve and end 47a of the sleeve is provided with an end wall 49 closing this end.

Sleeve 45 is hollow, being provided with a first bore 50 therein and a second bore 51 of slightly smaller diameter than bore 50, the two bores being connected by a circumferential shoulder 52. The outer wall of the sleeve is apertured adjacent end 46 by a plurality of radial openings 53 being shown as two in number diametrically opposite from one another. Openings 53 provide communication between bore 50 and cavity 40 as shown in Fig. 1. The outer wall of the sleeve is also apertured adjacent end 47a thereof, being provided with a plurality of radially extending openings 54 which provide communication between bore 51 and cavity 40 as shown in Fig. 2.

A cylindrical shuttle member 55 is slidably mounted within bore 50 and is provided with a bore 56 longitudinally therethrough. The shuttle member is provided with a circumferential channel 57 and a longitudinally extending circumferential flange 58 the outer end of which engages wall 41 to limit longitudinal movement of the shuttle member as shown in Fig. 1. Flange 58 is provided with a plurality of radially extending notches 59 which are shown as two in number diametrically opposite one another. In the position as shown in Fig. 1 the notches provide communication between bore 56 of the shuttle member, opening 53, and cavity 40. It is evident that notches 59 greatly restrict the flow of any fluid within the cavity and that the size of the notches may vary according to design considerations.

A circumferentially extending chamber 60 is provided in wall 76 of member 13 for a purpose hereinafter described and it should be noted that the diametrically inner portion 61 of the cavity extends beyond the outer surface of the sleeve member. End wall 49 of the sleeve is provided with an orifice 65 which extends longitudinally therethrough thereby providing communication between bore 51 and chamber 60. A valve 66 is provided in wall 76 for filling and emptying a suitable aircraft type hydraulic fluid into and from the device, it being understood that cavity 40, bores 50, 51, and chamber 60 are substantially filled with fluid at all times during operation of the device.

The operation of the device is as follows: The cylinder and piston are normally in extended position as shown in Fig. 1 with shuttle member 55 in engagement with wall 41. As the piston moves to the right within the cylinder, fluid will be forced from cavity 40 through aperture 53 against portions 70 and 71 of the shuttle member thereby forcing the shuttle member into the position shown in Fig. 2 wherein surface 72 thereof engages shoulder 52 of the sleeve. Fluid then passes through bore 56, bore 51 and orifice 65 into chamber 60. As the piston flange moves initially to the right, fluid will flow from chamber 60 into the space created between surface 75 of the piston flange and wall 76 of member 13. During this initial stage of movement, it is evident that apertures 54 are sealed by flange 35 and all the displaced fluid must pass through orifice 65 into chamber 60. As flange 35 moves to the right as seen in Fig. 1, apertures 54 are uncovered until the amount of fluid flow through the device is controlled solely by bore 56 within the shuttle member, and it is therefore apparent that the amount of damping in the compression stroke may be controlled by proper design of bore 56.

As the piston approaches the end of its compression stroke as seen in Fig. 2, flange 35 gradually closes aperture 53 thereby providing a cushioned action between the cylinder and piston substantially preventing the piston from bottoming against spacer member 48. On the return or expansion stroke, flange 35 will move to the left as seen in Fig. 2 whereby fluid will be displaced through apertures 54 against surface 72 of the shuttle member causing the shuttle to be moved to the position shown in Fig. 1 whereupon the displaced fluid can pass only through notches 59 thereby greatly restricting fluid flow. As the piston approaches the end of the expansion stroke, the piston flange will progressively cover apertures 54 until finally all of the fluid must flow through orifice 65 thereby providing a cushioning effect between the piston and cylinder on the return stroke.

It is evident that a relatively rapid compression stroke is possible since the fluid flow is controlled by bore 56, and yet a considerably slower expansion stroke is provided due to the fact that notches 59 control the fluid flow during the expansion stroke. The variable metering and accordingly the desired damping effect is obtained in a simple manner by reciprocal movement of the shuttle member. Additionally, the desired cushioning effect is obtained between the cylinder ends and the piston due to the action of the piston flange in progressively closing bores 53 and 54 near the end of the compression and expansion strokes respectively.

It is apparent from the foregoing that there is provided a new and novel fluid damping device which varies the metering effect in accordance with the direction of relative movement between two members and which provides a cushioning effect near the end of the compression and expansion strokes thereof. The device is simple and inexpensive in construction, yet is sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A fluid damping device which comprises a cylinder member and a piston member slidably disposed therein, said cylinder member enclosing a cavity therein, a sleeve fixedly supported in said cavity and having a first bore formed longitudinally through a portion thereof, a second bore formed longitudinally through another portion of said sleeve and communicating with said first bore, said bores being of different diameters and connected by a circumferential shoulder, a shuttle member slidably disposed in said first bore and having a bore formed longitudinally therethrough, one end of said shuttle member being adapted to engage said shoulder and limit longitudinal movement of said shuttle member, the opposite end of said shuttle member having a plurality of openings formed radially therethrough and being in communication with the bore through said shuttle member, a first plurality of apertures formed radially through said sleeve and being in communication with said first bore, a second plurality of apertures formed radially through said sleeve and being in communication with said second bore, an end wall closing the open end of said sleeve adjacent said second plurality of apertures and having an orifice formed therethrough, said cylinder member having a chamber formed therein adjacent said end wall, at least a portion of which chamber extends outward of the outer surface of said sleeve, said orifice providing communication between said second bore and said chamber.

2. A device as defined in claim 1 wherein said piston member has a circumferential flange formed on the outer surface thereof, said flange having an opening formed longitudinally therethrough, said sleeve extending through said opening in said flange and being in engagement with the inner surface of said flange surrounding said opening, said flange enclosing and sealing said second plurality of apertures when said piston member and said cylinder member are in normal extended position.

3. A device as defined in claim 2 wherein said flange is adapted to move relatively to said sleeve such that the flange progressively closes off said first plurality of apertures upon a compression stroke as said cylinder and said piston move toward one another.

4. A device as defined in claim 3 wherein said flange is adapted to move relatively to said sleeve such that the flange progressively closes off said second plurality of apertures upon an expansion stroke as said cylinder and said piston move away from one another.

5. A device as defined in claim 1 wherein said cavity is substantially filled with a fluid, and means for introducing into and venting fluid from said cavity.

6. A fluid damping device which comprises first and second telescoping members relatively movable to one another, said first telescoping member having a cavity formed therein, a hollow sleeve supported within said cavity, the outer wall of said sleeve being apertured adjacent opposite ends thereof, a shuttle member slidably mounted in said sleeve and having a longitudinal passage formed therethrough, means for limiting relative movement between said sleeve and said shuttle member, said second telescoping member having a circumferential flange formed on the outer surface thereof, said flange having an opening formed longitudinally therethrough, a portion of said sleeve being slidably disposed within said opening, said flange surrounding and sealing one apertured end portion of said sleeve when said telescoping members are in normal extended position, said sleeve including an end wall closing said one apertured end portion thereof, said end wall having an orifice formed therethrough, said first telescoping member having a chamber formed in the inner wall thereof for providing communication between said orifice and the cavity surrounding said sleeve, said orifice opening into said chamber.

References Cited in the file of this patent

UNITED STATES PATENTS

| | | |
|---|---|---|
| 1,368,429 | Ruesch et al. | Feb. 15, 1921 |
| 1,526,169 | Melchior | Feb. 10, 1925 |
| 1,833,121 | Norton | Nov. 24, 1931 |
| 1,836,381 | McNab | Dec. 15, 1931 |
| 1,898,335 | Bates | Feb. 21, 1933 |
| 1,935,741 | Gunn | Nov. 21, 1933 |
| 2,036,623 | Focht | Apr. 7, 1936 |